United States Patent
Bliss et al.

(10) Patent No.: US 8,826,322 B2
(45) Date of Patent: Sep. 2, 2014

(54) SELECTIVE CONTENT PRESENTATION ENGINE

(75) Inventors: Jason A. Bliss, Kent, WA (US); Luan Nguyen, Seattle, WA (US); Geoffrey E. Endresen, Everett, WA (US); Brian T. Smith, Seattle, WA (US); Bethel Shawn McMillan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 254 days.

(21) Appl. No.: 12/781,613

(22) Filed: May 17, 2010

(65) Prior Publication Data

US 2011/0283309 A1 Nov. 17, 2011

(51) Int. Cl.
| | |
|---|---|
| H04N 7/16 | (2011.01) |
| H04N 21/454 | (2011.01) |
| H04N 21/84 | (2011.01) |
| H04N 21/845 | (2011.01) |
| H04N 21/45 | (2011.01) |
| H04N 21/433 | (2011.01) |
| H04N 21/439 | (2011.01) |
| H04N 21/44 | (2011.01) |
| H04N 21/431 | (2011.01) |

(52) U.S. Cl.
CPC ........ *H04N 21/4542* (2013.01); *H04N 21/4334* (2013.01); *H04N 21/4333* (2013.01); *H04N 21/84* (2013.01); *H04N 21/8456* (2013.01); *H04N 21/4532* (2013.01); *H04N 21/4394* (2013.01); *H04N 21/44008* (2013.01); *H04N 21/4318* (2013.01)
USPC .......................................................... 725/25

(58) Field of Classification Search
USPC .......................................................... 725/25
See application file for complete search history.

(56) References Cited

U.S. PATENT DOCUMENTS

| | | | |
|---|---|---|---|
| 5,973,683 A * | 10/1999 | Cragun et al. ................ | 715/719 |
| 7,050,603 B2 | 5/2006 | Rhoads et al. | |
| 7,530,084 B2 * | 5/2009 | Dawson ......................... | 725/25 |
| 7,543,322 B1 | 6/2009 | Bhogal et al. | |

(Continued)

FOREIGN PATENT DOCUMENTS

| | | |
|---|---|---|
| EP | 1732324 | 12/2006 |
| JP | 2003524959 | 8/2003 |

(Continued)

OTHER PUBLICATIONS

PCT Search Report mailed Aug. 15, 2011 for PCT application No. PCT/US11/36194, 6 pages.

(Continued)

*Primary Examiner* — Brian T Pendleton
*Assistant Examiner* — Olugbenga Idowu
(74) *Attorney, Agent, or Firm* — Lee & Hayes, PLLC

(57) ABSTRACT

Selective content presentation for the purpose of self-imposed censoring of content is implemented on an electronic device. The selective content presentation involves acquiring a content suppression preference for suppressing content presentation at an electronic device. Subsequently, a content portion and a content selection tag for the content portion are also received at the electronic device. When the electronic device determines based on the content selection tag that a part of content portion is designated for suppression by the content suppression preference, the part of the content portion is obstructed by the electronic device to form a modified content portion. The modified content portion is further presented to a user via the electronic device.

30 Claims, 11 Drawing Sheets

(56) References Cited

U.S. PATENT DOCUMENTS

| | | |
|---|---|---|
| 2002/0083464 A1* | 6/2002 | Tomsen et al. ............... 725/112 |
| 2002/0147782 A1 | 10/2002 | Dimitrova et al. |
| 2004/0261099 A1* | 12/2004 | Durden et al. ................ 725/32 |
| 2006/0130118 A1* | 6/2006 | Damm ........................ 725/135 |
| 2007/0041706 A1 | 2/2007 | Gunatilake |
| 2007/0055980 A1 | 3/2007 | Megeid et al. |
| 2007/0157249 A1 | 7/2007 | Cordray et al. |
| 2009/0328093 A1 | 12/2009 | Cansler et al. |
| 2010/0077428 A1 | 3/2010 | Arnold et al. |

FOREIGN PATENT DOCUMENTS

| | | |
|---|---|---|
| JP | 2004526373 A | 8/2004 |
| JP | 2005311589 | 11/2005 |
| JP | 2006165848 | 6/2006 |
| JP | 2007524160 | 8/2007 |
| WO | WO02089482 | 11/2002 |

OTHER PUBLICATIONS

Extended European Search Report mailed Sep. 13, 2013 for European patent application No. 11783984.5, 11 pages.

Japanese Office Action mailed Sep. 10, 2013 for Japanese patent application No. 2013-511228, a counterpart foreign application of U.S. Appl. No. 12/781,613, 4 pages.

Translated Japanese Office Action mailed Feb. 12, 2014 for Japanese patent application No. 2013-511228, a counterpart foreign application of U.S. Appl. No. 12/781,613, 4 pages.

Translated Japanese Office Action mailed Jun. 10, 2014 for Japanese patent application No. 2013-511228, a counterpart foreign application of U.S. Appl. No. 12/781,613, 3 pages.

* cited by examiner

SELECTIVE CONTENT PRESENTATION ENGINE

BACKGROUND

Today, consumers may access content from a variety of content sources. These content sources may include traditional time-slotted broadcast content, as well as on-demand content. On-demand allows consumers the convenience of enjoying content at times and places of their own choosing. Because of the convenience offered by on-demand content and other technological advances, consumers are also increasingly using time-shifting devices (e.g., digital video recorders) to convert traditional time-slotted broadcast content into on-demand content.

However, as consumers are provided with more and more avenues and opportunities for accessing content at the times and places of their own choosing, such asynchronous consumption of content may frequently lead to situations in which details about some content are revealed to a consumer prior to the consumption of the content by the consumer. For example, a consumer who has time-shifted a particular sporting event for later viewing may be inadvertently exposed to the outcome of the particular sporting event while watching another live sporting event on broadcast television. Such revelations may detract from the content viewing experience of a consumer as the novelty and excitement associated with viewing content for the first time may be diminished. Moreover, as consumers exercise ever greater degrees of control over their consumption of content, their desire to tailor the content consumption to suit their own personal taste may also increase.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
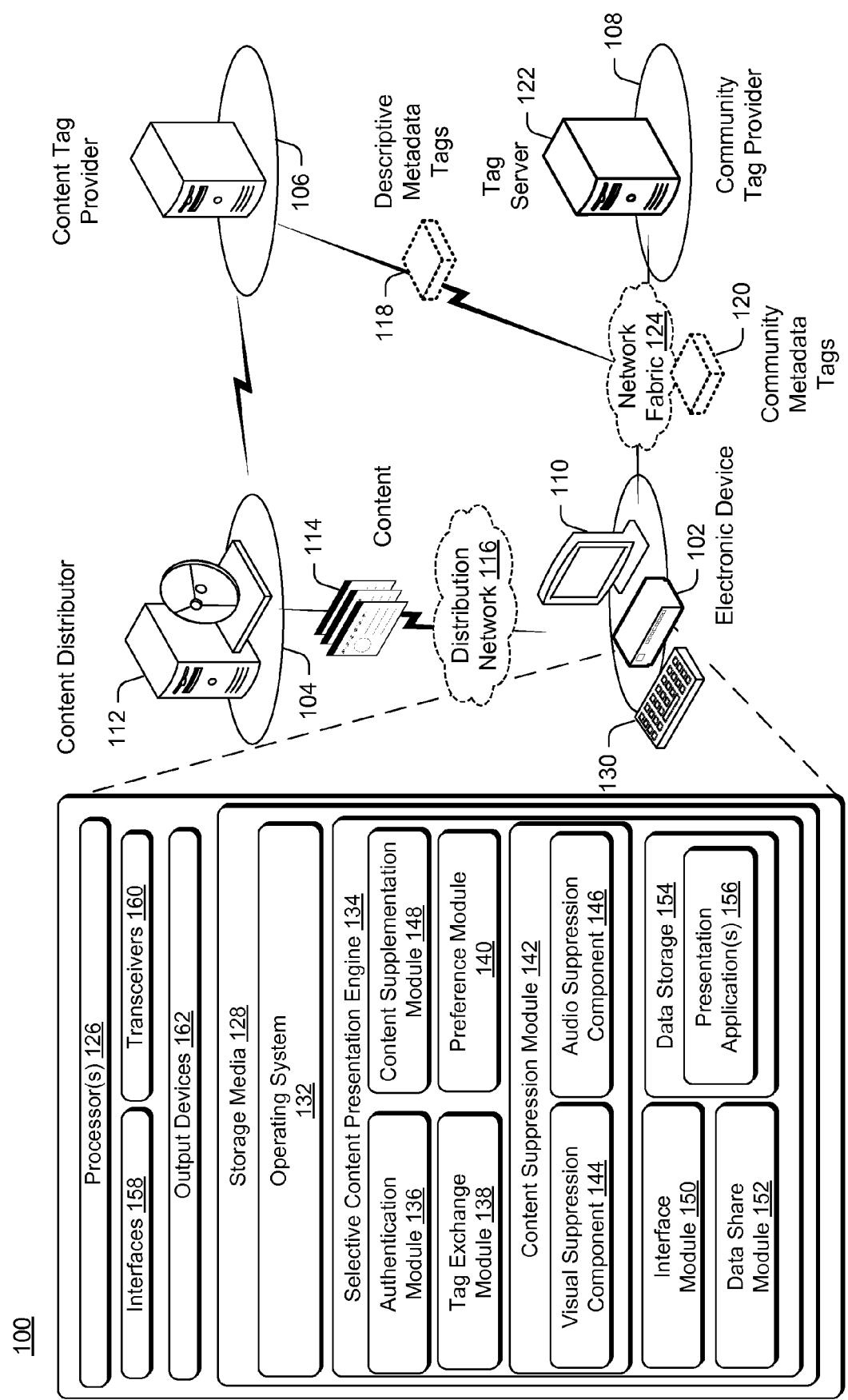
FIG. 1 shows an illustrative computing environment for implementing one or more embodiments of selective content presentation.

This disclosure is directed, in part, to techniques and devices for selective content presentation. In some embodiments, the selective content presentation techniques and devices may enable each individual user to filter time-slotted broadcast content and on-demand content for content portions that the respective user does not wish to access, or content portions that the user wishes to access at a later time. In various embodiments, depending on user preferences, the filtered-out content portion may be permanently blocked from being presented to the user or may instead replaced with another content portion.

For example, a user may be simultaneously watching a first sporting event broadcast on a television while recording a second, related sporting event broadcast using a digital video recorder. Accordingly, the user may desire to avoid learning the score for the second sporting event despite the fact that the score is mentioned by a sports commentator or presented in a score ticker as a part of the first sporting event broadcast. Thus, the techniques and devices described herein may automatically filter the first broadcast sporting event and may prevent such scores from being presented on the user's device (e.g., television) during the duration of the first sporting event broadcast. The techniques for selective content presentation to self-impose content blocking may also extend beyond the context of televisions and digital recorders to any other electronic devices on which a user may obtain content, such as computers and telecommunication devices.

In another example, a user may wish to view an on-demand movie with his or her family, but may find that the film rating indicates that the movie is unsuitable for young children. Nevertheless, rather than foregoing the family movie viewing experience, the user may use the selective content presentation techniques and devices described herein to prevent the unsuitable portions of the movie from being presented during the viewing of the movie.

In other embodiments, content providers may use the selective content presentation techniques described herein to enhance the content viewing experience of users by presenting additional information regarding the content that users are viewing. For example, based on user preferences and the content of a movie, a broadcaster of the movie may provide additional information regarding the characters, plot, cinematograph, locations, etc. that are present in the movie.

In various embodiments, the devices on which selective content presentation is implemented may include set top boxes, digital video recorders, telecommunication devices, computers, and other user electronics. In an example embodiment, the selective content presentation techniques involve acquiring a content suppression preference for suppressing content presentation at an electronic device. Subsequently, a content portion and a content selection tag for the content portion are also received at the electronic device. When the electronic device determines, based on the content selection tag, that a part of content portion is designated for suppression by the content suppression preference, the part of the content portion is obstructed by the electronic device to form a modified content portion. The modified content portion may then be presented to a user via the electronic device.

Illustrative System Architecture

FIG. 1 shows an illustrative computing environment for implementing one or more embodiments of selective content presentation. The computing environment 100 may include one or more electronic devices 102, a content distributor 104, a content tag provider 106, and one or more community tag providers 108.

Content Distributor

The content distributor 104 may include a content server 112 that stores content 114. As used herein, "content" may refer to media objects, such as audio and/or visual works, as well as text objects, such as text-based documents, text-based web pages (e.g., search results), blogs, micro-blog, emails, instant messages, text messages, and/or the like. The stored content 114 may include media objects such as movies, television programs, music, sporting events, dramas, and/or the like. Additionally, the content server 112 may also control the distribution of live a media object (e.g., live feeds that are not previously stored), and/or media objects that are stored at other locations. The content distributor 104 may broadcast media objects across the distribution network 116 to one or more electronic devices 102. The distribution network 116 may be based on any data transmission technology, such as cable, microwave, satellite, fiber optic, and/or the like. Additionally, data may be transmitted across the distribution network 116 using any type of network topology and any network communication protocol.

Content Tag Provider

The content tag provider 106 may provide descriptive metadata tags 118 to the media objects distributed by the content distributor 104. In various embodiments, the content tag provider 106 may be an integral part of and/or under the control of the content distributor 104. In some embodiments, the descriptive metadata tags 118 may be content selection tags that enable an electronic device 102 to selectively suppress media objects. For example, an electronic device 102 may receive user preferences for media objects and/or content portions of media objects that a user does not desire to consume. Accordingly, when the metadata tags of a particular media object indicate that the media object includes the undesirable content, the electronic device 102 may omit the presentation of the undesirable media object or at least an undesired portion of the media object. As used herein, "content portion" may refer to any portion of content, such as a frame of a visual image in a media object, a particular audio segment in a media object, and/or a portion of a text object.

In another example, an electronic device 102 may receive preferences regarding media objects (e.g., broadcast sporting events) that a user does not desire to consume before a specific date and time. As such, when the metadata tags of a particular media object indicate that the particular media object includes a description of another media object the user wishes to save for future consumption, the electronic device 102 may suppress the description present in the particular media object until the specific data and time arrives. For instance, the device may suppress presentation of a sports ticker illustrating a score of a particular sporting event.

In other embodiments, the descriptive metadata tags 118 may be content enrichment tags that enable an electronic device 102 to selectively present supplemental information regarding media objects. For example, in a scenario in which a media object is a movie, the content enrichment tags for the media object may include additional information regarding the characters, plot, cinematograph, locations, etc. that are present in the movie. Accordingly, when an electronic device 102 receives user preferences regarding supplemental information that a user desires to have access to during the consumption of the media object, the electronic device 102 may present the desired supplemental information to enhance viewing experience. Thus, in some embodiments, the content distributor 104 may integrate the descriptive metadata tags 118 from the content tag provider 106 with a media object prior to broadcasting the media object to one or more electronic devices 102 via the distribution network 116.

Community Tag Provider

The one or more community tag providers 108 may provide community-generated tags (or "community metadata tags 120") to the media objects distributed by the content distributor 104. In some instances, each of the community tag providers 108 is independent from the content distributor 104. In various embodiments, a community tag provider 108 may be any organization, group, or individual that is interested in contributing community metadata tags 120 for different media objects, regardless of purpose or motivation. For example, a community tag provider 108 may be a parent group that is interested in preventing children from viewing content that the parent group deems objectionable in various movies. Accordingly, the parent group may develop their own content selection tags for a particular movie that, when implemented by an electronic device 102, prevent the electronic device 102 from presenting portions of the particular movie (e.g., audio portions that include profane language, video portions that include lewd or violent behavior, etc.).

In another example, a community tag provider 108 may be a group of travel enthusiasts that desires to present location information and trivia for each location featured in various movies. Accordingly, the group of travel enthusiasts may develop their own content enrichment tags that encapsulate such information for a specific movie. Thus, if desired, a user may cause an electronic device 102 to download such content enrichment tags and display them when the specific movie is being presented.

As shown in FIG. 1, a community tag provider 108 may include a tag server 122 that is responsible for collecting and organizing various submitted metadata tags. For example, the tag server 122 may present a web interface page that enables one or more members to submit community metadata tags 120 for different media objects. In at least one embodiment, the web interface page may be access via an electronic device 102. In turn, the tag server 122 may sort and organize the submitted community metadata tags 120, and may transmit the community metadata tags 120 to the electronic devices 102 upon request.

Electronic Device

The one or more electronic devices 102 may include any electronic device that is capable receiving and/or presenting media and text objects. In various embodiments, each of the electronic devices 102 may include a set top box that is coupled to a television 110, such as a cable box receiver, satellite receiver, off-the-air receiver, AM/FM radio receiver, satellite radio receiver, or any other device capable of receiving time-slotted broadcast content from the content distributor 104. Each of the electronic devices 102 may also include a computer (e.g., laptop computer, computer, tablet computer, etc.), a portable music player, a gaming device, a television, a telecommunication device (e.g., mobile phone, personal digital assistant (PDA), etc.), and/or other electronic devices that are capable of receiving and presenting content.

The electronic devices 102 may obtain the descriptive metadata tags 118 and the community metadata tags 120 via a network fabric 124. In various embodiments, the network fabric 124 may be a local area network ("LAN"), a larger network such as a wide area network ("WAN"), or a collection of networks, such as the Internet. Protocols for network communication, such as TCP/IP, may be used to implement the network fabric 124. In some embodiments, at least a portion of the network fabric 124 may overlap with the distribution network 116.

The electronic device 102 may include one or more processors 126, a storage media 128, and input devices 130 that enable a user to interact with the device. The input devices 130 may include, but are not limited to, combinations of one or more of keypads, keyboards, mouse devices, touch screens, microphones, speech recognition packages, and any other suitable devices or other electronic/software selection methods. An operating system 132 may be stored in the storage media 128. In at least one embodiment, the storage media 128 may include volatile memory and/or non-volatile memory.

The operating system 132 may include components that enable the electronic device 102 to receive data via various inputs (e.g., user controls, network interfaces, and/or memory devices), and process the data using the one or more processors 116 to generate output. The operating system 132 may include a display component that presents the output (e.g., display an image on an electronic display, store data in memory, transmit data to another electronic device, etc.). Additionally, the operating system 132 may include other components that perform various other functions generally associated with an operating system.

Further, the storage media 128 may also store the various modules of a selective content presentation engine 134. The modules may include routines, programs, objects, components, and data structures that cause the electronic device 102 to perform particular tasks. In various embodiments, the modules may include an authentication module 136, a tag exchange module 138, a preference module 140, a content suppression module 142 (that further includes a visual suppression component 144 and an audio suppression component 146), a content supplementation module 148, an interface module 150, a data share module 152, and a data storage 154.

The authentication module 136 may authenticate a user so that the user may create or log into a selective content presentation account on the electronic device 102. In various embodiments, the authentication module 136 may initially prompt the user to enter an authentication credential for a corresponding account. The authentication credential may include one or more of user name, password, electronic identifier, digital certificate, biometric characteristics, and/or the like. Subsequently, the authentication module 136 may enable access to a created selective content presentation account when the user submits the same authentication credential.

The tag exchange module 138 may enable the selective content presentation engine 134 to receive descriptive metadata tags 118 and/or community metadata tags 120 that suppress the display of certain content or, alternatively, enrich certain content (e.g., content enrichment tags). In some embodiments, the tag exchange module 138 may parse the descriptive metadata tags from a broadcast stream received from the content distributor 104. In other embodiments, the tag exchange module 138 may receive the community metadata tags 120 via a selectable user interface menu that enables a user to designate a tag source. For example, the user may use the user interface menu to navigate to a local directory on the electronic device 102 or a removable storage accessible to the electronic device 102, where the community metadata tags are stored. Alternatively, the user may also use the user interface menu to navigate to a web location, such as to a particular website or a file transfer site from which the community metadata tags may be downloaded. The user may access and interact with such a user interface menu via the input devices 130. The tag exchange module 138 may receive the descriptive metadata tags 118 and/or the community metadata tags 120 in different data files, and may store the data files in the data storage 154.

In other embodiments, the tag exchange module 138 may also enable the user to transfer data files that include descriptive metadata tags 118 or community metadata tags 120 to another electronic device. Additionally or alternatively, the tag exchange module 138 may enable the user to upload user-created community metadata tags 120 to the community tag provider 108. For example, the tag exchange module 138 may generate a user interface menu for display on the electronic device 102 that enables a user to select a removable storage of the electronic device 102 or a remote location where the data files are to be transferred, such as tag server 122 of the community tag provider 108.

Once a user is authenticated, the preference module 140 may receive user preferences for the presentation of content by the electronic device 102. In some embodiments, the user may enter preferences regarding media objects or text objects that a user does not desire to consume before a specific date and time. For example, in an instance in which the electronic device 102 is a digital video recorder, the user may select from an electronic program guide (EPG) a broadcast television program that the user desires to record for viewing at a later time. In such an example, the preference module 140 may automatically designate the broadcast television program as content that the user does not desire to consume until the user views the recording. Subsequently, the preference module 140 may command the content suppression module 142 to suppress the display of all content related to the designated broadcast television program.

In other embodiments, the preference module 140 may also enable the selective content presentation engine 134 to receive universal content suppression preferences. For instance, the user may desire content that is consumed on the electronic device 102 to be free from certain text (e.g., offensive words), audio portions (e.g., profanities), and/or images (e.g., images of a particular individual or a sports score ticker). With respect to text portions of content to be suppressed, the preference module 140 may offer a text-input interface menu when activated by the user. For example, the user may activate the preference module 140 via the input devices 130 (e.g., by clicking a particular key). The text input interface menu may enable the user to enter a string of text that the user wishes to suppress from content that is being viewed on the electronic device 102.

With respect to audio portions of media objects to be suppressed, the preference module 140 may offer different input options on a display of the electronic device 102 (e.g., the television 110) when activated by the user. Accordingly, the user may have the ability to select one of the input options to submit preferences that suppress audio portions of various media objects.

In one instance, the preference module 140 may present a user interface menu that enables the user to select, from an editable list, a word or phrase that the user does not desire to hear or see. In another instance, the preference module 140 may present a user interface menu that enables the user to enter (e.g., via a virtual on-screen keyboard or a physical keyboard) words or phrases that the user does not desire to hear or see. In still other instances, the preference module 140 may enable the user to verbally input (e.g., into a microphone) the same words or phrases. In such instances, the preference module 140 may use a speech recognition algorithm to convert the spoken speech into electronic data that is stored in the data storage 154. The words or phrases that the user inputs via the preference module 140 may be added to the editable list. In still other instances, the preference module 140 may present a user interface that enables the user to select categories of audio portions to be suppressed. For example, the user interface may include a menu that permits the user to select sound categories such as "profanities", "explosions", "scary sounds", and/or the like. Moreover, FIG. 2 further shows an illustrative user interface that enables the user to select a portion of an audio track of a media object portion for suppression.

Figure 2:
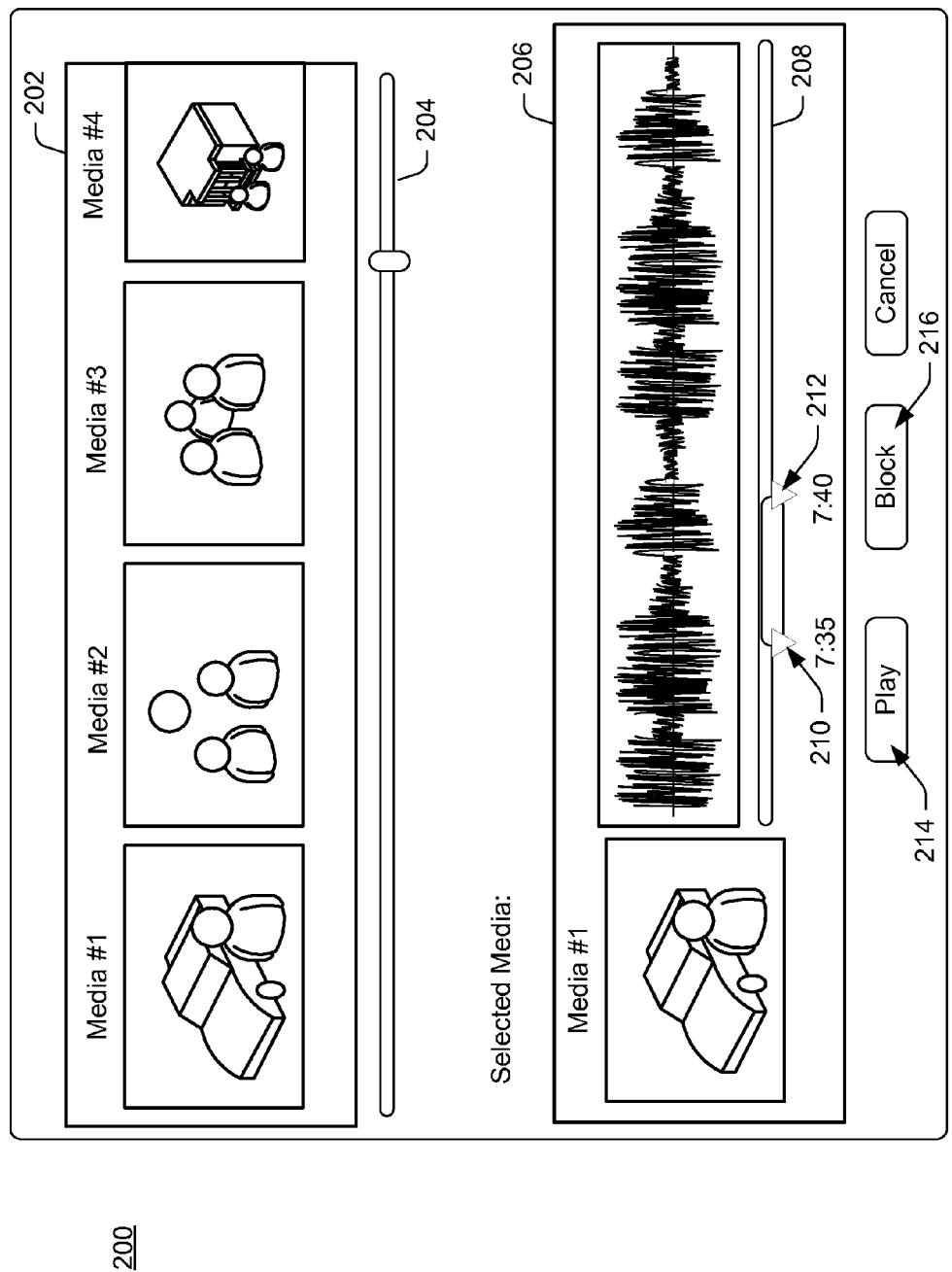
FIG. 2 shows an illustrative user interface that enables the user to select a portion of an audio track of a media object for selective presentation.

FIG. 2 shows an illustrative user interface 200 that enables the user to select a portion of an audio track of a media object for suppression. The preference module 140 may present the user interface 200 when the user provides an input via the input devices 130. As shown in FIG. 2, the user interface 200 may include a content selection portion 202 that enables the user to select a media object, in which the selected media object includes an audio portion that the user desires to suppress. In various embodiments, the content selection portion 202 may display media objects that are available on the electronic device 102, that is, either stored on the electronic device 102 or accessible via the electronic device 102. The content selection portion 202 may include a scroll bar that enables the user to browse the available media objects.

Once the user has selected a desired media object that contains an audio portion to be suppressed, the selected media object may be displayed in a segment selection portion 206 of the user interface 200. The segment selection portion 206 may include a selection bar 208 that enables the user to play back a specific audio portion of the media object, in which the entire selection bar 208 represents the time duration of the media object. In various embodiments, the selection bar 208 may include a start marker 210 that corresponds to the beginning of the audio portion that the user desires to suppress. The start marker 210 may be accompanied by a time indicator that shows time information. The selection bar 208 may further include an end marker 212 that corresponds to the end of the audio portion that the user desires to suppress. The end marker 212 may be accompanied by a time indicator that shows time information. Thus, by adjusting each of the start marker 210 and the end marker 212 along the selection bar 208, the user may select a particular audio portion of the media object. To assist the user in precisely selecting the audio portion, the user interface 200 may also include a play option 214 that enables the user to hear the selected audio portion. In this way, the user may select a particular profanity, a particular sound effect, or any other sound samples from a media object. Once the user is satisfied with the selection of the audio portion, the user may activate (e.g., click) the block option 216. Upon activation of the block option 216, the preference module 140 may pass the audio suppression data to the content suppression module 142 so that suppression of the selected audio may be implemented for all media objects. In this way, the content suppression module 142 of the electronic device 102 may prevent future playback of the audio portion, whether the audio portion is from the same media object or another media object.

Figure 3:
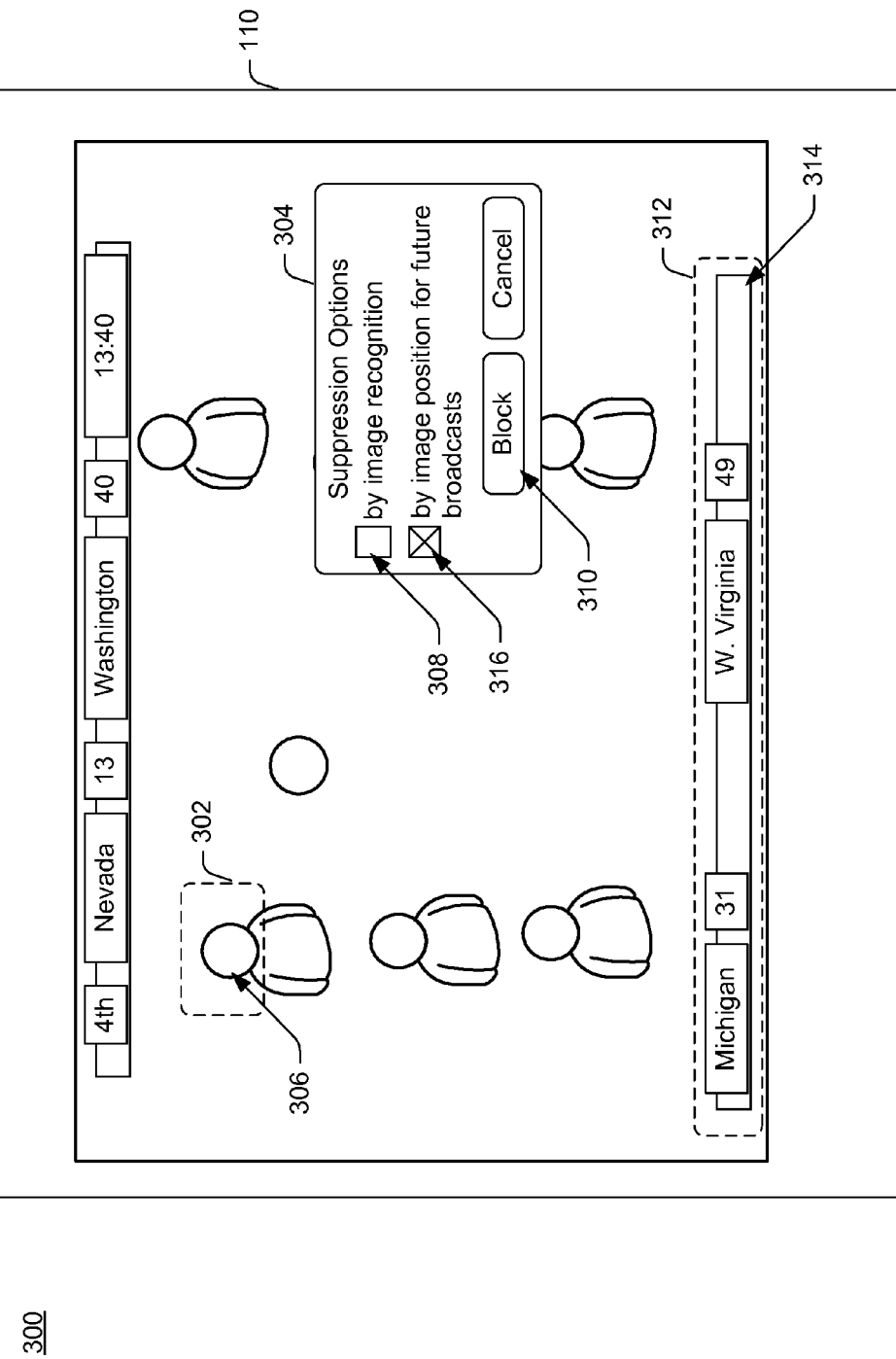
FIG. 3 shows an illustrative user interface that enables a user to suppress undesired visual portions of content.

FIG. 3 shows an illustrative user interface 300 that enables a user to suppress undesired visual portions of content. As shown in FIG. 3, the preference module 140 may present a visual selection tool that enables the user to select a portion of visual content that is presented on the display of the electronic device 102 (e.g., the television 110) for suppression. In some embodiments, the preference module 140 may provide an adjustable superimposed rectangle 302 and a suppression option menu 304 when the user activates one of the input devices 130. The user may further manipulate the input devices 130 (e.g., arrow keys), so that the superimposed rectangle 302 encapsulates a portion of the visual content (e.g., the face 306 of a person). Subsequently, the user may select the "suppression by image recognition" option 308 from the suppression option menu 304, and then activate (e.g., click) the block button 310 to implement the suppression of selected visual content portion from future media object presentations.

In other embodiments, the user may manipulate a superimposed rectangle 312 to block a stationary visual content portion, such as a visual content portion in a particular type of television program. For example, a recurring television program may be a sporting event broadcast from a particular broadcaster (e.g., Monday Night Football), and the stationary visual content portion may be a score ticker 314 that shows game scores for related sport events that the user may wish to time shift, i.e., record and view in the future. In such embodiments, the user may manipulate the superimposed rectangle 312 so that it surrounds the score ticker 314. Subsequently, the user may select the "suppression by image position for further broadcasts" option 316, and then activate (e.g., click) the block button 310 to implement the suppression of the selected visual content portion from future broadcasts of the same type (e.g., sporting event broadcast from the same broadcaster).

Returning to FIG. 1, the content suppression module 142 may include a visual suppression component 144 that blocks visual content portions from being displayed based on the suppression data received from the preference module 140 and/or content selection tags from various sources. In some embodiments, the visual suppression component 144 may receive image recognition data related to one or more visual content portions that are to be suppressed when future content is displayed. For example, the user may provide such data to the visual suppression component 144 via the option 308 of the user interface 300. Thus, the visual suppression component 144 may use an image recognition algorithm to filter all media objects prior to the media objects being displayed by a presentation application 156. When the visual suppression component 144 detects that a media object includes a visual content portion (e.g., images, text) to be suppressed, the visual suppression component 144 may obstruct the visual content portion.

In such embodiments, the image recognition algorithm may be based on different types of models and classifiers that recognize images. Such classifiers and models may include, but are not limited to, support vector machines (SVM), Hidden Markov Models (HMMs), Bayesian networks, decision tree models, fuzzy logic models, and/or other probabilistic, statistical, and/or stochastic classification models that can be trained to recognize images via training inputs.

The visual suppression component 144 may also suppress visual content portions based on stationary visual content suppression data for recurring content (e.g., another episode of a recurring television program) that is received at the preference module 140. As described above, the user may provide such stationary image suppression data via the selection option 312 of the user interface 300. In various embodiments, the visual suppression component 144 may monitor the descriptive metadata tags 118 associated with content that are to be displayed on the electronic device 102. Thus, when the visual suppression component 144 determines from the monitored descriptive metadata tags 118 that the content to be displayed is recurring content, the visual suppression component 144 may initiate an obstruction of the stationary visual content portions of the recurring content that were selected via the selection option 312. For example, in an instance in which the visual suppression component 144 determines that the recurring content is another broadcast of Monday Night Football, the visual suppression component 144 may automatically obstruct the game score ticker (e.g., score ticker 314 shown in FIG. 3), so that the user may be prevented from inadvertently viewing undesired information.

The visual suppression component 144 may further suppress visual content portions based on user preferences in the form of time-shift data. As described above, in embodiments where the electronic device 102 is a digital video recorder, the user may have selected via an EPG a television program to record for later viewing. Accordingly, the preference module 140 may command the visual suppression component 144 to monitor the descriptive metadata tags 118 for new content to be displayed. Thus, when the descriptive metadata tag 118 indicates that the content to be displayed contains visual information related to the time-shifted television program, the visual suppression component 144 may obstruct the visual information. For example, the user may have programmed the electronic device 102 to record a particular episode of the television show "Lost" for later viewing. Subsequently, while channel surfing, the user may encounter content in the form of an episode preview for the particular episode of "Lost". Alerted by the monitoring of the descriptive metadata tag 118 for the episode preview, the visual suppression component 144 may obstruct the visual part of the episode preview from being displayed to the user. An audio component may also be suppressed in some instances, depending on the user's preferences.

The visual suppression component 144 may additionally suppress visual portions of a media object based on user preferences and the descriptive metadata tags 118 from the content tag provider 106. The content tag provider 106 may be under the control of the content distributor 104. In various embodiments, the descriptive metadata tags 118 may be processed by the electronic device 102 to provide several visual versions of the content, such as different censored versions of the content. For example, the user may wish to watch content in the form of a movie with his family. However, the descriptive metadata tags 118 may show that the movie is unsuitable for family viewing, e.g., "R" rated. Nevertheless, the descriptive metadata tags 118 may make it possible for the user to use the electronic device 102 to generate more family-appropriate versions of the movie.

In various instances, a first set of description metadata tags 118 may cause the electronic device 102 to obstruct one or more visual portions (e.g., violent images) of the movie from being viewed so that the movie effectively becomes a "PG-13"-rated movie. A second set of description metadata tag 118 may cause the electronic device 102 to obstruct a different set of visual portions so that the movie may effectively become a "PG"-rated movie. Thus, the content suppression module 142 may generate a user interface menu that enables the user to select one of the versions of the movie to generate. It will be appreciated that while the generation of different visual versions of the movie is described with respect to the visual suppression component 144, the actual generation of different versions of movies may also involve the use of an audio suppression component 146 of the content suppression module 142, as described below.

In a similar manner, the visual suppression component 144 may suppress visual portions of a media object based on user preferences and the community metadata tags 120 from the community tag provider 108. For example, the community tag provider 108 may be an organization that desires to prevent movies from showing images of alcohol consumption. Accordingly, when the user enables the electronic device 102 to suppress visual portion of a movie based on the community metadata tags 120, the community metadata tags 120 may cause the visual suppression component 144 to obstruct one or more portions (e.g., images, scenes, etc.) of the movie in which consumption of alcohol by the characters is depicted.

In the various embodiments described above, the obstruction of a visual content portion by the visual suppression component 144 may include blurring via pixelation the visual content portion, or replacing the visual content portion with another image, such as an opaque shape or some other visual content. For example, the visual suppression component 144 may automatically replace the face of a person in a media object image with the face of another person. The obstruction may also include blanking out the media object image that contains the undesirable visual content completely, such as by replacing the media object image with a blank image or a preconfigured image. In some instances, the images may be provided with a message that explains the reason for the image, such as "content contains spoilers for recorded program", "content unsuitable for viewing due to preferences," and/or the like. The blank image may also include an optional interface that the user may activate to cause the visual suppression component 144 to undo the obstruction of the content.

Figure 4:
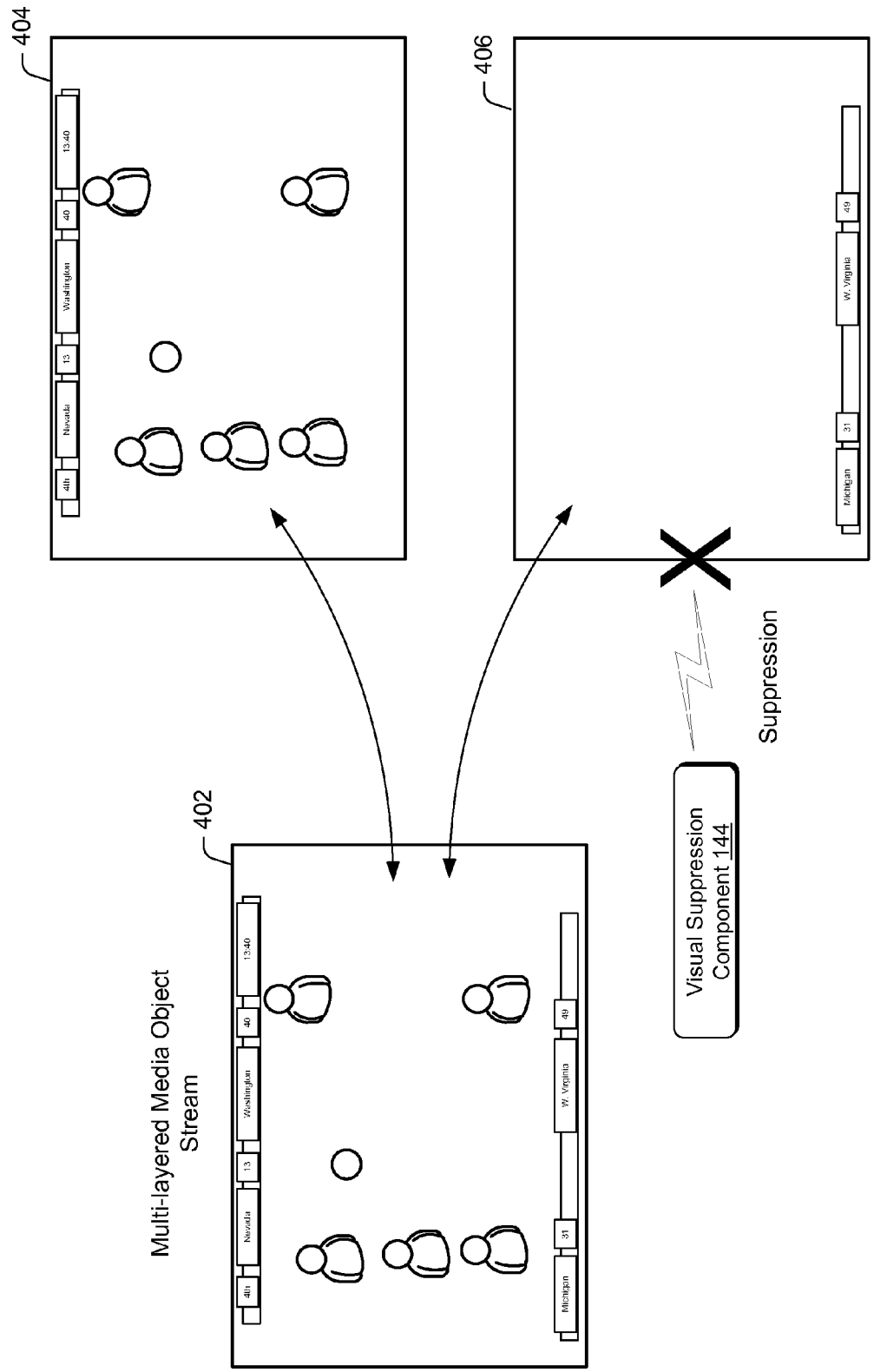
FIG. 4 shows the selective presentation of multi-layered visual content by the visual suppression component.

FIG. 4 shows the visual suppression of multi-layered visual content by the visual suppression component 144. As shown in FIG. 4, media object stream 402 from the content distributor 112 may actually include multiple visual broadcast streams, such as streams 404 and 406, which are layered on top of each other to generate the single media object broadcast when presented by the electronic device 102. For example, the media object stream 402 may be a sports broadcast in which the sporting event of interest is visually broadcasted via media object sub stream 404. The media object sub stream 406 of the media object stream 402 may include supplemental information, such as scores of related sporting events, that is visually superimposed on top of the media object sub stream 404. The media object stream 402 may be further accompanied by descriptive metadata tags 118 that indicate the nature and information that is contained in each of the multiple sub streams.

Accordingly, the visual suppression component 144 may suppress at least one sub stream of a multi-layered media object broadcast (e.g., media object sub stream 404) from being displayed by the electronic device 102 based on user preferences and the descriptive metadata tags 118. For example, the preference module 140 of the electronic device 102 may provide a user interface menu, based on the information in the descriptive metadata tags 118, which enables the user to select whether media object sub stream 406 is to be displayed along with media object sub stream 404. In other words, the user decided whether he or she wants to see the scores for the related sporting events while watching the main sporting event. However, in other embodiments, the visual suppression component 144 may also suppress at least one sub stream of a multi-layered media object broadcast based on time-shift data, and/or community metadata tags 120.

Returning to FIG. 1, the content suppression module 142 may further include an audio suppression component 146 that suppresses audio content portions from being presented based on the suppression data received from the preference module 140 and/or content selection tags from various sources.

In some embodiments, the audio suppression component 146 may receive audio recognition data for the suppression of audio portions in a media object that is to be presented by the electronic device 102. Thus, the audio suppression component 146 may use an audio recognition algorithm to filter all media objects prior to the media objects being presented. In some embodiments, the audio suppression component 146 may use the audio recognition algorithm to compare the audio portions of a media object to a pre-stored audio portion, such as an audio portion that the user verbally inputted to the electronic device 102 or an audio portion that the user selected via the user interface 200 described in FIG. 2. In other embodiments, the audio recognition algorithm of the audio recognition algorithm may compare speech in the audio portions of the new media object to words or phrases to be suppressed that the user has inputted as text or selected from a list of text. Accordingly, when the audio suppression component 146 detects that a media object includes an audio portion (e.g., speech, sound effect, etc.) to be suppressed, the audio suppression component 146 may obstruct the audio portion from being presented by the electronic device 102.

In such embodiments, the audio recognition algorithm may be based on different types of models and classifiers that recognize audio segments. Such classifiers and models may include, but are not limited to, support vector machines (SVM), Hidden Markov Models (HMMs), Bayesian networks, decision tree models, fuzzy logic models, and/or other probabilistic, statistical, and/or stochastic classification models that can be trained to recognize audio segments via training inputs.

Like its visual suppression counterpart, the audio suppression component 146 may also suppress audio portions based on user preferences in the form of time-shift data. As described above, in embodiments where the electronic device 102 is a digital video recorder, the user may have selected via an EPG a television program to record for later viewing. Accordingly, the preference module 140 may command the audio suppression component 146 to monitor the descriptive metadata tags 118 for new content to be presented on the electronic device 102. Thus, when the descriptive metadata tag 118 indicates that the content to be presented contains audio information related to the time-shifted television program, the audio suppression component 146 may obstruct the audio portion. For example, the user may have programmed the electronic device 102 to record a particular episode of television show "Lost" for later viewing. Subsequently, while channel surfing, the user may encounter content in the form of episode preview for the particular episode of "Lost". Alerted by the monitoring of the descriptive metadata tag 118 for the episode preview, the audio suppression component 146 may obstruct the audio part of the episode preview from being presented to the user.

The audio suppression component 146 may additionally suppress audio portions of a media object based on user preferences and the descriptive metadata tags 118 from the content tag provider 106. The content tag provider 106 may be under the control of the content distributor 104. Like its counterpart the visual suppression component 144, the audio suppression component 146 may likewise generate different audio versions of a media object. For example, by using the descriptive metadata tags 118, the audio suppression component 146 may obstruct one or more audio portions (e.g., profanities) so that a movie may be converted to multiple versions of different ratings (e.g., R, PG-13, etc.). The audio suppression component 146 may also use the descriptive metadata tags 118 of a media object to suppression certain categories of sounds designated by the user for suppression. For example, the description metadata tags 118 for a movie may indicate that a particular audio portion of the movie includes sounds that fall into the "explosion" category. As a result, the audio suppression component 146 may suppress the particular audio portion.

In a similar manner, the audio suppression component 146 may suppress audio portions of media object based on user preferences and the community metadata tags 120 from the community tag provider 108. For example, the community tag provider 108 may be a music group that believes its song was used in a movie without proper royalty payments. Thus, the music group may produce one or more community metadata tags 120 that suppress its song from being presented during a particular scene of the movie. Accordingly, when the user, who may be a supporter of the music group, enables the electronic device 102 to suppress audio based on the community metadata tags 120, the audio suppression component 146 may obstruct the song from being played during the viewing of the movie.

In the various embodiments described above, the obstruction of an audio content portion by the audio suppression component 146 may include muting the audio content portion or replacing the audio content portion with another sound portion (e.g., a special sound effect, a pre-selected word or phrase, and the like).

The content suppression module 142 may also provide user interfaces that enable the user to undo or modify the user suppression preferences. In various embodiments, the user may use the content suppression module 142 to define audio and visual suppression preferences for any period of time, such as permanent suppression, suppression for a day, a week, or any other time interval.

The content supplementation module 148 may present information to the user based on the descriptive metadata tags 118 or community metadata tags 120 that are content enrichment tags. The information may be simultaneously presented with media objects that the user is consuming. In various embodiments, the user may use the preference module 140 to designate categories of content enrichment tags that are to be presented with each media object. For example, with respect to a movie, the content enrichment tags for the movie may fall into several categories, such as location tags, product tags, character tags, cinematograph tags, and/or the like. Location tags may supply additional information regarding various locations that are seen in the movie. Product tags may supply additional information regarding products that are featured in the movie. Likewise, character tags may supply information regarding the back story behind each character, while cinematography tags may include movie production trivia and comments. An illustrative user interface that enables the user to select categories of content enrichment tags for presentation during the consumption of media object is shown in FIG. 5.

Figure 5:
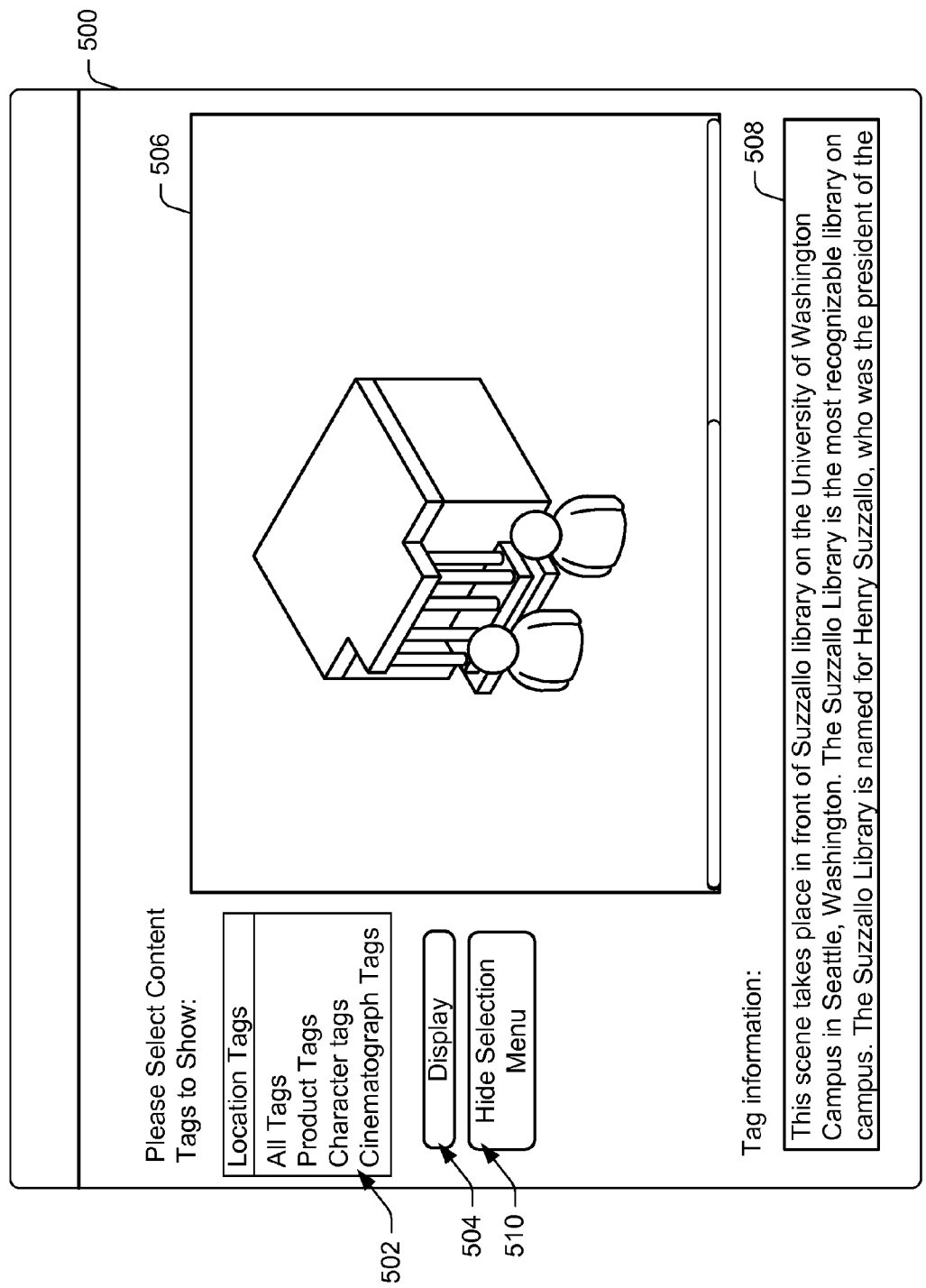
FIG. 5 shows an illustrative user interface that enables the user to select categories of content enrichment tags for display during the presentation of a media object.

FIG. 5 shows an illustrative user interface 500 that enables the user to select categories of content enrichment tags for display during the presentation of a media object. The preference module 140 may present the user interface 500 when the user provides an input via the input devices 130. As shown in FIG. 5, the user interface 500 may include a category selection menu 502 that enables a user to select a particular category of content enrichment tags to be displayed for the media object. Following the selection of one or more categories of content enrichment tags to be displayed, the user may activate (e.g., click) the display button 504 to save the selection. In some embodiments, the user may access the category selection menu 502 during the playback of the media object. For example, the electronic device 102 may be a digital video recorder, and the media object may be a movie that the user recorded via a digital video recorder. Accordingly, the user interface 500 may include a screen portion 506 that shows the current playback of the media object.

The content supplementation module 148 may display the content of each enrichment tag in a tag information portion 508 of the user interface 500. Thus, as the media object is presented in the current playback or subsequent playbacks, the tag information portion 508 may be continuously updated with information related to the current portion of the media object that is displayed in the screen portion 506. The user interface 500 may further include a hide selection button 510. When activated (e.g., clicked), the hide selection button 510 may convert the user interface 500 into a media playback screen in which only the screen portion 506 and the tag information portion 508 are visible. In some embodiments, the tag information portion 508 may display active links as well as text information. For example, when tag information of a product tag is being displayed in the tag information portion 508, the tag information may include a hyperlink that a user may activate (e.g., click) to open up a web page. The web page may provide more information or an advertisement regarding the product shown in a particular portion of the media object.

Figure 6:
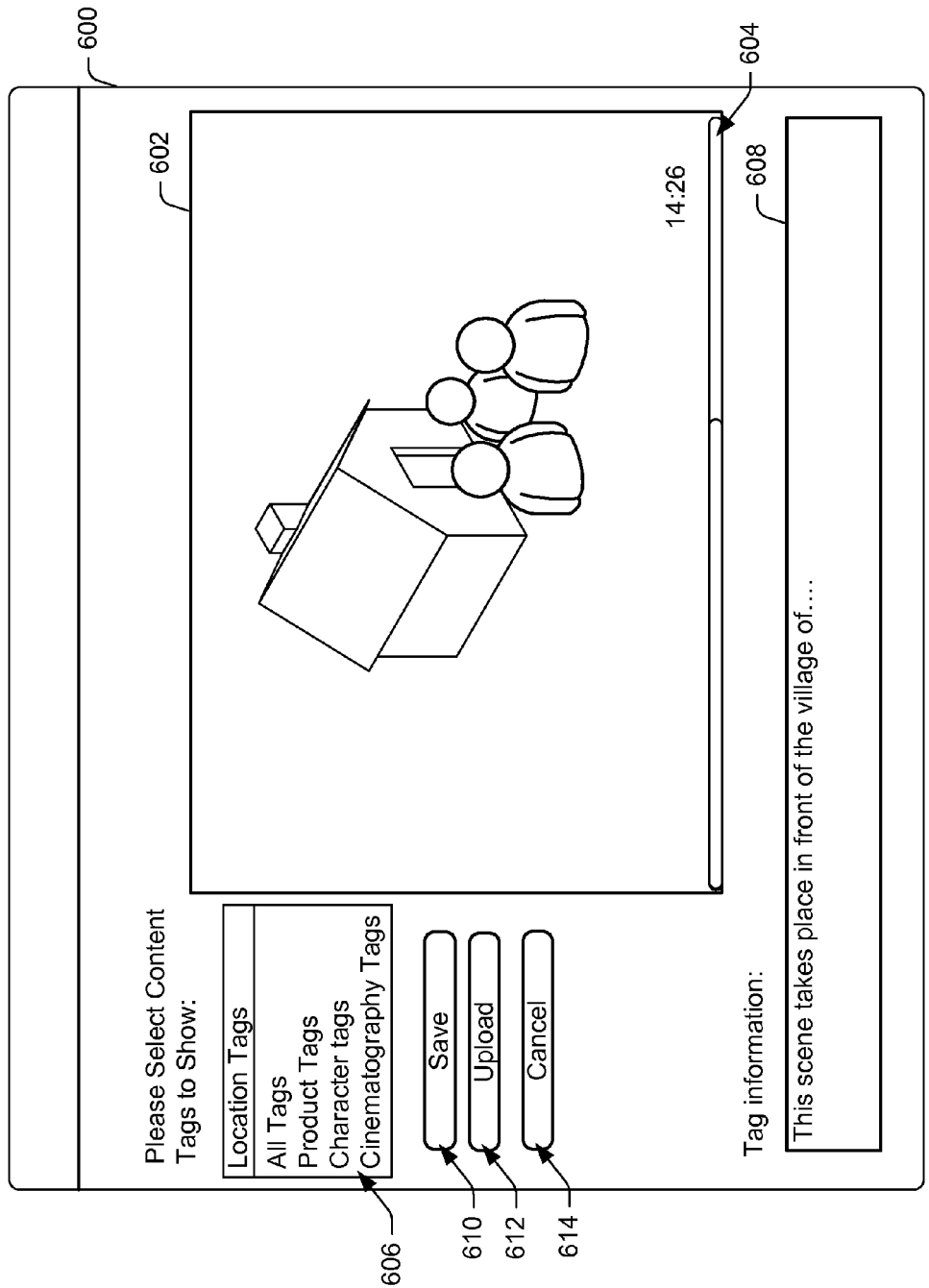
FIG. 6 shows an illustrative user interface that enables the user to add content enrichment tags to a media object.

FIG. 6 shows an illustrative user interface 600 that enables the user to add content enrichment tags to a media object. In various embodiments, the user may be watching the playback of a media object presentation when the user decides that a new content enrichment tag is to be entered for a particular portion the media object. For example, the media object may be a movie, and the particular portion may be a specific scene in the movie. Accordingly, the user may provide an input via the input devices 130 that cause the pauses the playback of the media object by a media presentation application and the preference module 140 to present the user interface 600.

As shown in FIG. 6, the user interface 600 may include a screen portion 602 that shows an image from the media object, as well as the paused time location in the media object where the new content enrichment tag may be inserted. In some embodiments, the screen portion 602 may further include a scroll bar 604 that user may move back and forth to adjust the time location where the new content enrichment tag may be inserted. The user interface 600 may further include a category selection menu 606 that enables the user to select a particular category for a new content enrichment tag. Following the selection of a particular content enrichment tag category, the user may enter more information to be encapsulated in the new content enrichment tag in the tag information portion 608. For example, the user may be a travel enthusiast who decides to add a new content enrichment tag regarding a location featured in a particular scene of the media object. Subsequently, the user may activate the save button 610 to cause the content supplementation module 148 to save the new content enrichment tag to the data storage 154. The preference module 140 may also save the association between new content enrichment tag and the media object, so that the new content enrichment may be displayed during future presentations of the media object.

In further embodiments, the user may further use the upload button 612 to cause the content supplementation module 148 to upload the new content enrichment tag to a tag server 122 of the community tag provider 108. For example, the community tag provider 108 may be a travel enthusiast organization to which the user belongs. In such embodiments, the activation (e.g., click) of the upload button 612 may cause the preference module 140 to open up a communication connection to the tag server 122 and upload a data file that includes the new enrichment tag. It will be appreciated that in additional embodiments, rather than upload each new content enrichment tag individually, the preference module 140 may also provide a menu option that enables the user to perform batch uploads of multiple self-created content enrichment tags via a data file. The user interface 600 may also include a cancel button 614 that enables the user to exit the user interface 600.

Figure 7:
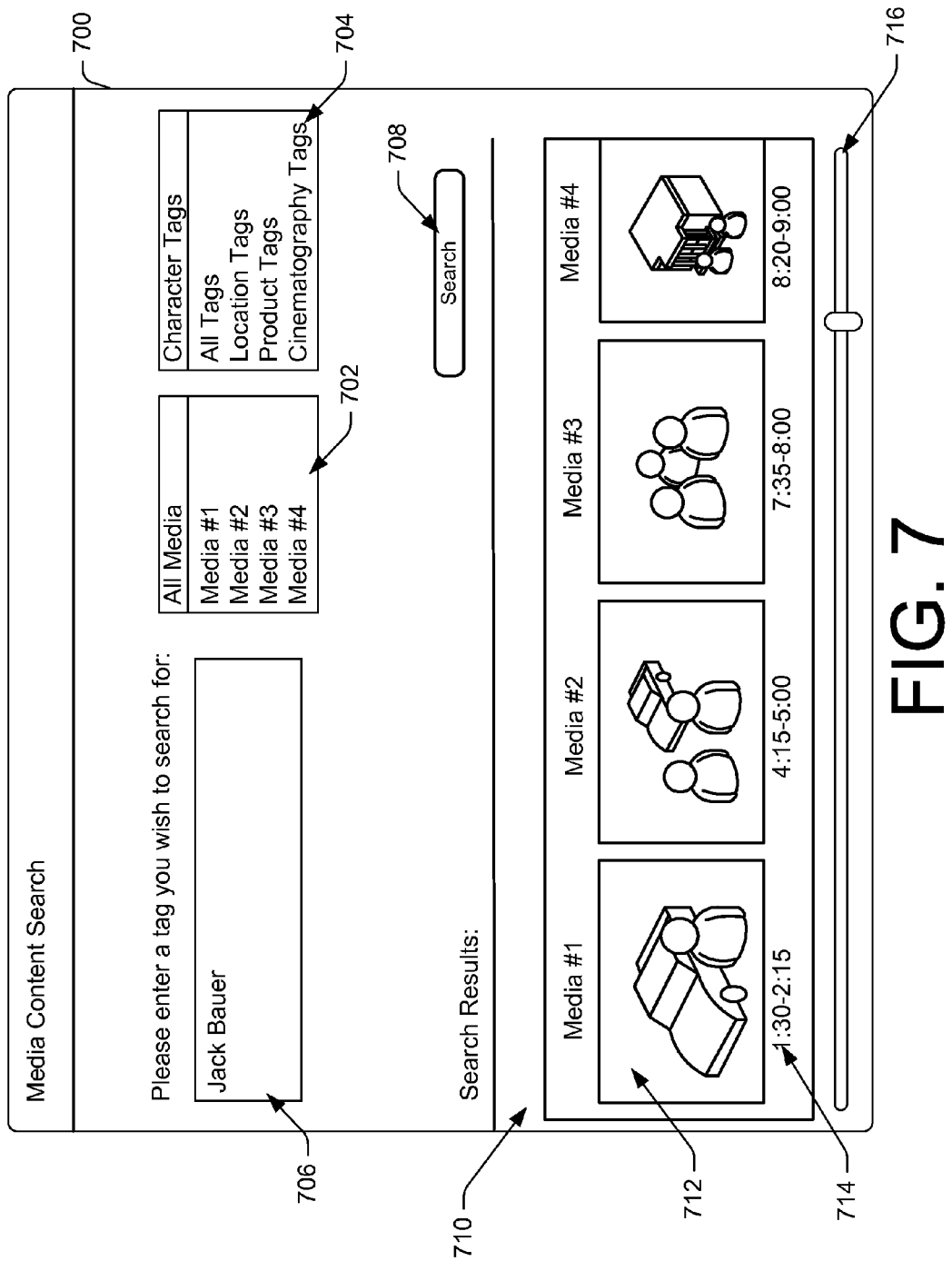
FIG. 7 shows an illustrative user interface that enables the user to search the content enrichment tags associated with a media object.

FIG. 7 shows an illustrative user interface 700 that enables the user to search the content enrichment tags associated with a media object. The content supplementation module 148 may present the user interface 700 when the user provides an input via the input devices 130. As shown in FIG. 7, the user interface 700 may include a media selection menu 702 that enables the user to designate one or more available media objects to be included in the search. For example, in an instance where the electronic device 102 is a digital video recorder, the media objects shown in the media selection menu 702 may be stored on the digital video recorder or are available to the digital video recorder. The media objects may contain content enrichment tags that are from the content distributors 104, community tag providers 108, and/or the user of the electronic device 102.

The tag selection menu 704 may enable a user to select one or more categories of content enrichment tags that may be searched. For example, in an instance in which the media objects are movies, the categories of content enrichment tags may include character tags, location tags, product tags, cinematography tags, and/or the like. The tag search portion 706 may enable the user to input a search string. Once the user has entered the search string in the tag search portion 706, the user may active (e.g., click) the search button 708 to search for one or more media objects with content enrichment tags that contain the search string.

The search results area 710 may display one or more thumbnail representations, such as thumbnail representation 712, of corresponding media objects that include matching content enrichment tags. In some embodiments, each of the media objects displayed in the search results area 710 may further include time location information, such as time location information 714. The time location information 714 may indicate the portion of the media object (e.g., in minutes) that is associated with the matching content enrichment tag. In such embodiments, the user may activate (e.g., click) each of the thumbnail representations to view the corresponding media object or view the portion of the media object in which the matching content enrichment tag appears. The user interface 700 may further include a scroll bar 716 that enables the user to browse the thumbnail representations in the search results area 710.

Returning to FIG. 1, the interface module 150 may enable a plurality of presentation applications 156 to interface with the selective content presentation engine 134 for the purpose of suppression or supplementing media objects. The presentation applications 156 may include stand-alone media presentation applications that may be installed on the electronic device 102, media presentation application that are built into the electronic device 102, web browser applications, communication applications such as email applications, messaging applications, and/or any other software application that is capable of presenting a media object or a text object. In some embodiments, the interface module 150 may include application program interfaces (APIs) that enable the media presentation applications to access the suppression and supplementation components of the selective content presentation engine 134. In other embodiments, the interface module 150 may include a plug-in interface or an extension interface that enables the selective content presentation engine 134 to act as a plug-in or an extension to a media presentation application, a web browser application, or a communication application, such as an email application, messaging application, and/or the like. In this way, a multitude of different presentation application may be enhanced with content suppression or supplementation capabilities.

The data share module 152 may enable the selective content presentation engine 134 to share its user preferences, content selection tags, and/or content enrichment tags with other electronic devices. For example, the data share module 152 may automatically upload the user preferences and settings to a data storage server that is part of a content distribution network (CDN) and/or part of a cloud computing storage. Thus, when the user authenticates to another electronic device 102 that includes the selective content presentation engine 134, the data share module 152 on that electronic device 102 may download the user preferences and content selection settings. In this way, the user may be assured of consistent user experience across multiple electronic devices 102.

The data storage 154 may store content in the form of various text objects and media objects, the presentation applications 156 that present content, as well as data used by the selective content presentation engine 134. In various embodiments, the data may include authentication credentials, descriptive metadata tags 118, community metadata tags 120, user-added content selection tags and content enrichment tags, data for performing image or audio recognition, and other user preferences and content selection settings used by the selective content presentation engine 134.

The electronic device 102 may further include interfaces 158, transceivers 160, and output devices 162. The interfaces 158 may include any one or more of an Ethernet interface, wireless LAN interface, a near field interface, a DECT chipset, or an interface for an RJ-11 or RJ-45 port. The a wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. For instance, the electronic device 102 may use a Wi-Fi interface to communicate directly with a nearby device. The near field interface can include a Bluetooth® interface or RFID for transmitting and receiving near field radio communications via a near field antenna. For example, the near field interface may be used for functions such as communicating directly with nearby devices that are also, for instance, Bluetooth® or RFID enabled. A reader/interrogator may be incorporated into the electronic device 102. In various embodiments, the interfaces 158 may be activated and controlled by the data interface module 126 of the electronic device 102.

The transceivers 160 may include any sort of transceivers that enable the electronic device 102 to communicate with another device via a wired connection or a wireless connection. For example, transceivers 160 may include a radio transceiver and interface that performs the function of transmitting and receiving radio frequency communications via an antenna. The radio interface facilitates wireless connectivity between the electronic device 102 and various cell towers, base stations and/or access points.

The output devices 162 may include any sort of output devices that enable the electronic device 102 to present content that has been modified by the selective content presentation engine 134. The output devices 162 may include display and speakers. The display may be a liquid crystal display or any other type of display commonly used in telecommunication devices. For example, the display may be a touch-sensitive display screen, and can then also act as an input device or keypad, such as for providing a soft-key keyboard, navigation buttons, or the like. Output devices 162 may also include ports for one or more peripheral devices, such as headphones, peripheral speakers, or a peripheral display.

In various embodiments, the electronic device 102 that includes the selective content presentation engine 134 may be a peripheral device that further modifies the media object outputted by another device. In some embodiments, the electronic device 102 may be a pair of electronic headphones that is connected to a portable music player. Accordingly, the electronic device 102 may modify the media object that is outputted by the portable music player so that a user hears a modified media object even though the original media object outputted by the portable music player remains unchanged. In other embodiments, the electronic device 102 may be electronic glasses that, under the guidance of the selective content presentation engine 134, selectively block a portion of a media object presentation that is being presented on a display device (e.g., television). For example, the electronic glasses may include lenses that change opacity in response to electrical current. In this way, the user who is wearing the electronic glasses may view a modified version of the media object presentation.

Illustrative Operations

FIGS. 8-11 show illustrative processes 800-1100 that implement techniques for selective content presentation. Each of the processes 800-1100 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 800-1100 are described with reference to the computing environment 100 of FIG. 1.

Figure 8:
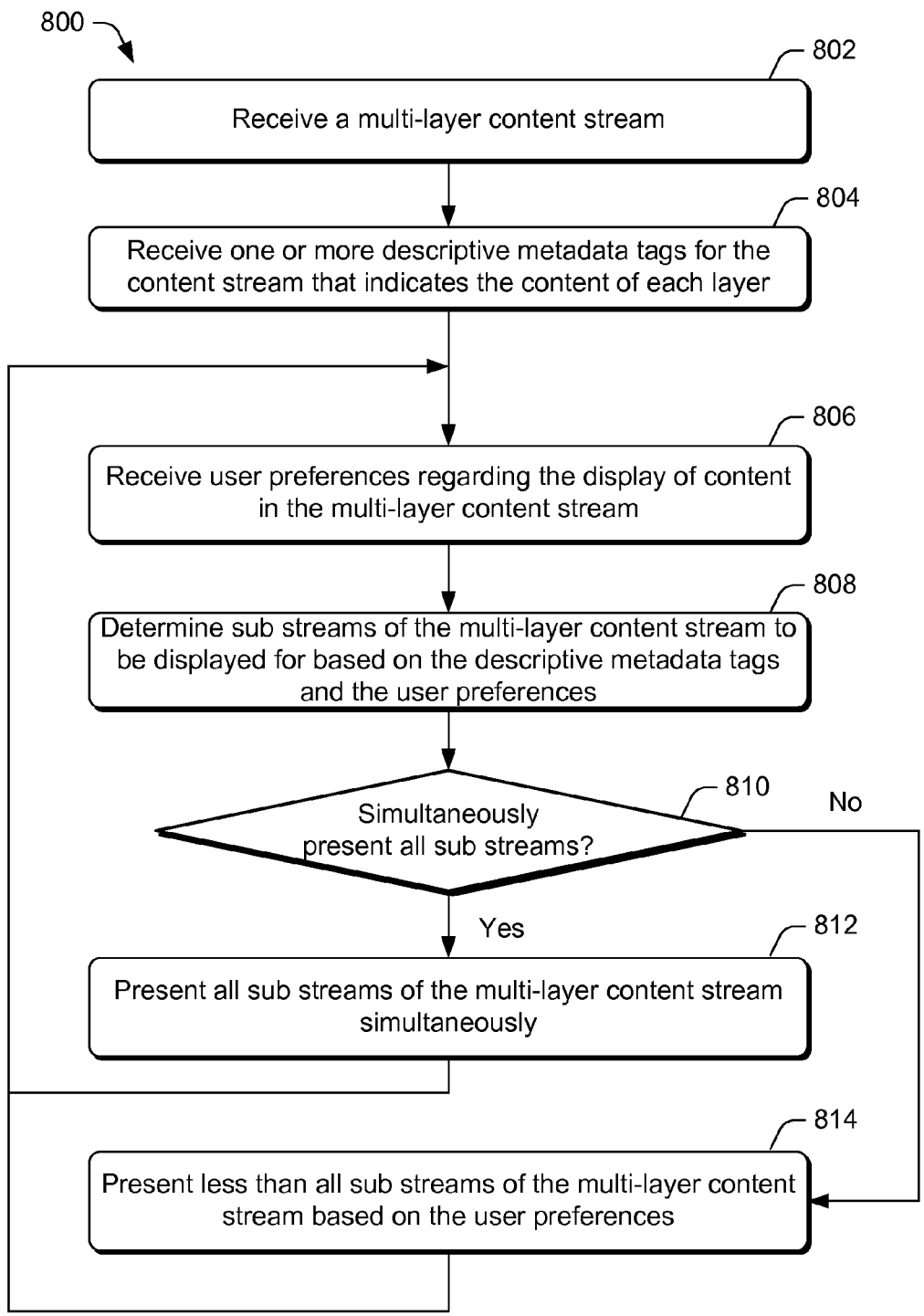
FIG. 8 is a flow diagram of an illustrative process for the selective presentation of content in a multi-layer content stream based on user preferences.

FIG. 8 is a flow diagram of an illustrative process 800 for selectively presenting content of a multi-layer content stream based on user preferences. At block 802, the electronic device 102 may receive a multi-layer content stream for presentation by a presentation application of the electronic device. At block 804, the electronic device 102 may also receive one or more descriptive metadata tags 118 (e.g., content selection tags) for the content stream. For example, the multi-layer content stream may be a multi-layer sporting event broadcast stream that includes a live action sub stream, as well as a supplemental information sub stream that provides score tickers and animation. Accordingly, the one or more descriptive metadata tags 118 may indicate the content of each sub stream of the multi-layer content stream, such as live action in one sub stream and supplemental information in a second sub stream. In various embodiments, the one more descriptive metadata tags 118 may be embedded in the multi-layer content stream by a content distributor 104.

At block 806, the selective content presentation engine 134 of the electronic device 102 may receive user preferences regarding the display of content in the multi-layer content stream. In various embodiments, the multi-layer content stream may be an audio stream, a visual stream, or an audio-visual stream. Thus, the user preferences may dictate whether each of the sub streams in the content stream is to be presented during presentation of the multi-layer content stream.

At block 808, the selective content presentation engine 134 of the electronic device 102 may determine the sub streams of the multi-layer content stream to be displayed. The selective content presentation engine 134 may make such a determination based on the descriptive metadata tags 118 and the user preferences. In various embodiments, the engine 134 may determine the content of each sub stream in the multi-layer content stream by examining the corresponding descriptive metadata tags 118, and then compare the content to the received user preferences.

At decision block 810, if the selective content presentation engine 134 determines that all sub streams of the multi-layer content stream is to be simultaneously presented ("yes" at decision block 810), the process 800 may proceed to block 812. For example, in the scenario in which the multi-layer stream is a sporting event broadcast stream described above, the received user preferences may indicate that the user wishes to view both the live action sub stream and the supplemental score information sub stream.

At block 812, the selective content presentation engine 134 may not suppress any of the sub streams in the multi-layer content stream. Thus, the electronic device 102 may present all sub streams of the multi-layer content stream simultaneously. Subsequently, the process 800 may loop back to block 806, at which point the selective content presentation engine 134 may receive additional user preferences regarding the presentation of the multi-layer content stream.

However, if the selective content presentation engine 134 determines that not all sub streams of the multi-layer content stream is to be simultaneous displayed ("no" at decision block 810), the process 800 may proceed to block 814. For example, in the scenario in which the multi-layer stream is a sporting event broadcast stream described above, the received user preferences may indicate that the user wishes to view the live action sub stream, but does not wish to view the supplemental score information sub stream.

At block 814, the selective content presentation engine 134 may suppress one or more of the subs streams of the multi-layer content stream. Accordingly, the electronic device 102 may present less than all sub streams of the multi-layer content stream based on the user preferences. In various embodiments, the actual sub streams of the multi-layer content stream that the electronic device 102 presents may be dependent on the actual user preferences. Subsequently, the process 800 may loop back to block 806, at which point the selective content presentation engine 134 may receive additional user preferences regarding the presentation of the multi-layer content stream.

Figure 9:
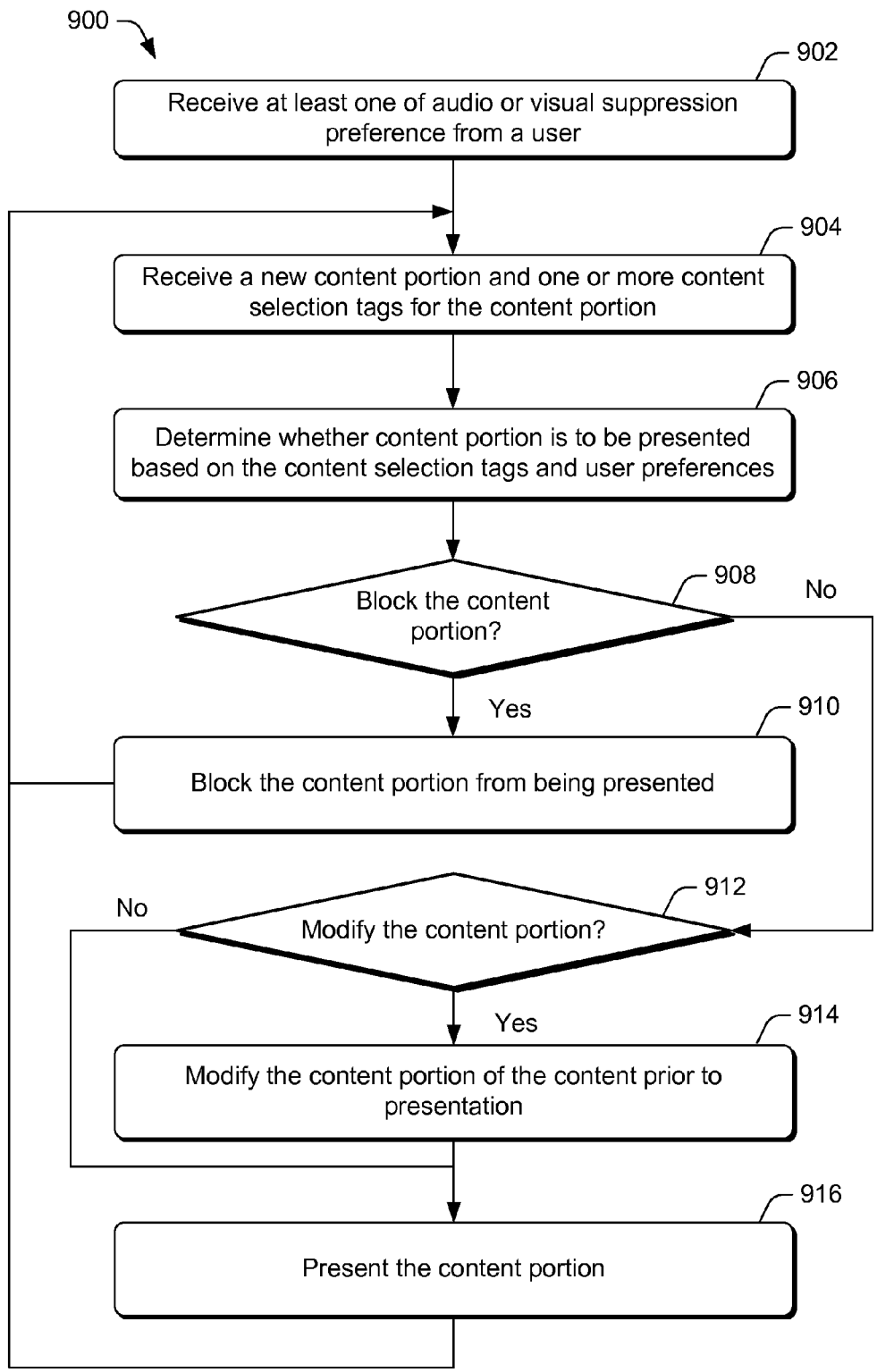
FIG. 9 is a flow diagram of an illustrative process for blocking or modifying content for presentation based on user preferences and content selection tags for the content.

FIG. 9 is a flow diagram of an illustrative process 900 for blocking or modifying content for presentation based on user preferences and content selection tags for a content portion. At block 902, the selective content presentation engine 134 of the electronic device 102 may receive at least one of audio or visual suppression preferences from a user. In various embodiments, the preference module 140 may receive user preferences regarding audio and/or visual content portions that the user does not wish to consume before a specific time, or audio and/or visual content portion that the user desires to suppress from being viewed or heard by the user.

At block 904, the selective content presentation engine 134 may receive a new content portion and one or more content selection tags for the new content portion. In various embodiments, the content portion may be a portion of a media object or a text object that is received by the electronic device 102 for presentation. For example, the content portion may be distributed to the electronic device 102 by the content distributor 104 as part of a broadcast, or otherwise is being presented by electronic device 102, such as content that is being played from the data storage 154. The one or more content selection tags for the content portion may be from various sources, such as from the content tag provider 106, the community tag provider 108, and/or the user of the electronic device 102.

At block 906, the selective content presentation engine 134 may determine whether the content portion is to be presented by the electronic device 102 based on the content selection tags of the content portion and the user preferences. In various embodiments, the content portion may be a frame of visual image or an audio segment in a media object, or specific text in a text object.

At decision block 908, if the selective content presentation engine 134 determines that the content portion is to be completed blocked ("yes" at decision block 908), the process 900 may proceed to block 910. For example, the content selection tags may indicate that the content portion may contain audio profanity that the user preferences designated that user does not wish to hear.

At block 910, the selective content presentation engine 134 may block the content portion being presented. Thus, in the audio profanity example above, the engine 134 may suppress the portion by muting the audio profanity. Subsequently, the process 900 may loop back to block 904 so that a subsequent content portion may be received and analyzed by the selective content presentation engine 134. However, if the selective content presentation engine 134 determines that the content portion is not to be completely blocked ("no" at decision block 908), the process 900 may proceed to decision block 912.

At decision block 912, if the selective content presentation engine 134 determines that the content portion is to be modified ("yes" at decision block 912), the process 900 may proceed to block 914. For example, the content selection tags may indicate that a particular part of the content portion shows an undesired profanity in text form, and the user preferences may indicate that the user desires to only block a part of the content portion, such as by blocking the particular part of the content portion that shows the profanity.

At block 914, the selective content presentation engine 134 may modified the content portion by replacing or suppressing a part of the content portion. For example, the selective content presentation engine 134 may replace a part of the content portion that is a visual image (e.g., a face of a person) with a different graphic (e.g., face of another person). At block 916, the modified content portion may be presented by a presentation application of the electronic device 102. Subsequently, the process 900 may loop back to block 904 so that a subsequent content portion may be received and analyzed by the selective content presentation engine 134.

However, if at decision block 912 the selective content presentation engine 134 determines that the content portion does not need to be modified ("no" at decision block 912), the process 900 may proceed to block 916, at which point the content portion may be presented by the presentation application of the electronic device 102. For example, the selective content presentation engine 134 may determine that, based on the user preferences and content selection tags, the content portion does not need to be modified or blocked in any way. Following the presentation, the process 900 may loop back to block 904 so that a subsequent content portion may be received and analyzed by the selective content presentation engine 134.

Figure 10:
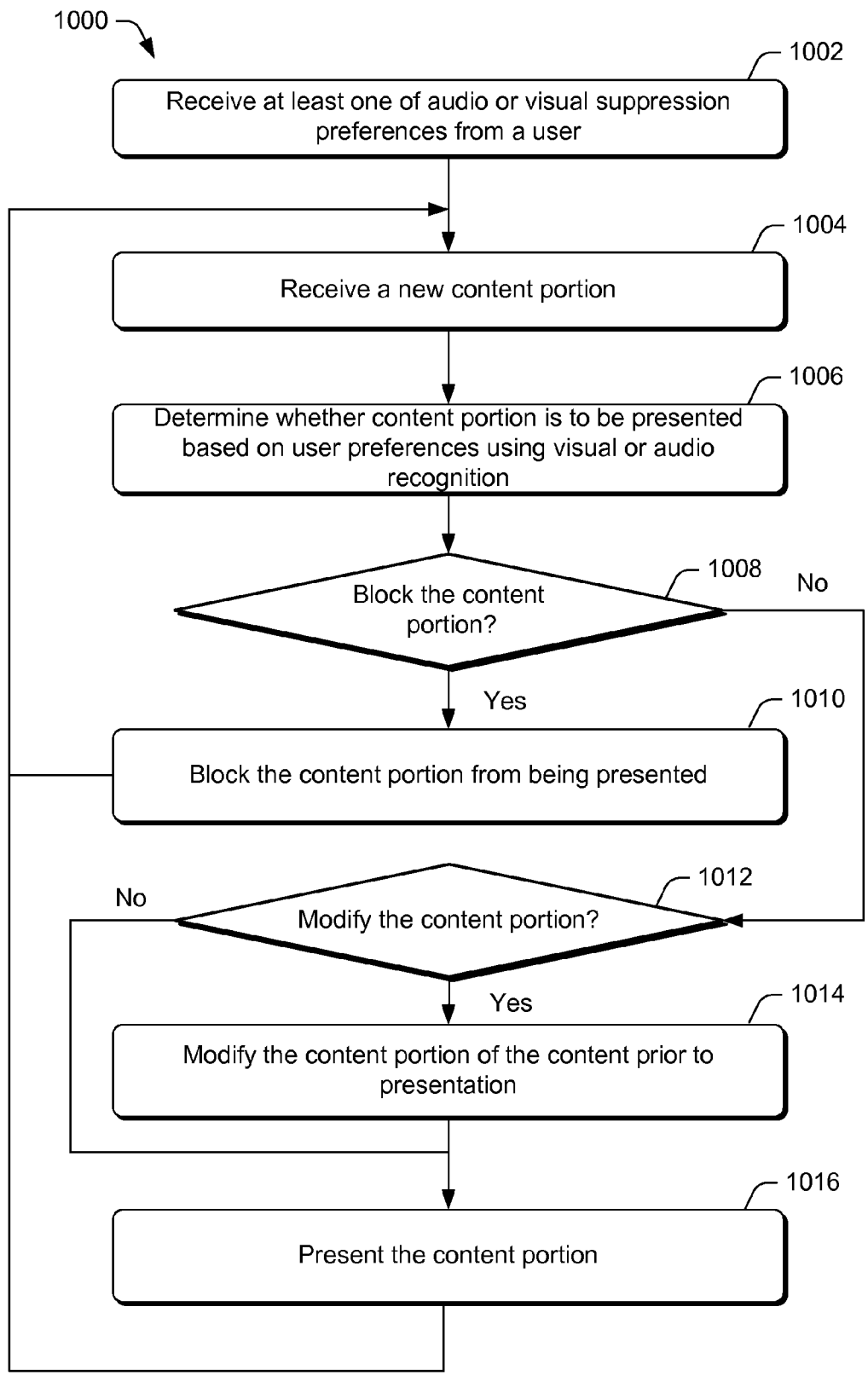
FIG. 10 is a flow diagram of an illustrative process for blocking or modifying the content in a content portion based on user preferences.

FIG. 10 is a flow diagram of an illustrative process 1000 for blocking or modifying the content in a content portion based on user preferences. At block 1002, the selective content presentation engine 134 of the electronic device 102 may receive at least one of audio or visual suppression preferences from a user. In various embodiments, the preference module 140 may receive user preferences regarding audio and/or visual content portions that the user does not wish to consume before a specific time, or audio and/or visual content portion that the user desires to suppress from being viewed or heard by the user.

At block 1004, the selective content presentation engine 134 may receive a new content portion. In various embodiments, the content portion may be a portion of a media object or a text object that is accessible to the electronic device 102. For example, the content portion may be distributed to the electronic device 102 by the content distributor 104 as part of a broadcast, or otherwise is being presented by electronic device 102, such as content that is being played from the data storage 154.

At block 1006, the selective content presentation engine 134 may determine whether the content portion is to be presented by the electronic device 102 based on the user preferences using visual or audio recognition. In various embodiments, the content portion may be a frame of visual image or an audio portion of a media object, or specific text in a text object. For example, the selective content presentation engine 134 may use an image recognition algorithm to recognize an image (e.g., a face of a particular person) in a media object. In another example, the selective content presentation engine 134 may use an audio recognition algorithm to recognize a sound (e.g., loud explosion sound effect) in the media object.

At decision block 1008, if the selective content presentation engine 134 determines that the content portion is to be completed blocked ("yes" at decision block 1008), the process 1000 may proceed to block 1010. For example, the user preferences may indicate that the user does not wish to hear loud explosion sound effects recognized by the audio recognition algorithm of the selective content presentation engine 134.

At block 1010, the selective content presentation engine 134 may block the content portion being presented. Thus, in the loud explosion sound effect example above, the selective content presentation engine 134 may suppress the portion by muting the audio profanity. Subsequently, the process 1000 may loop back to block 1004 so that a subsequent content portion may be received and analyzed by the selective content presentation engine 134. However, if the selective content presentation engine 134 determines that the content portion is not to be completely blocked ("no" at decision block 1008), the process 1000 may proceed to decision block 1012.

At decision block 1012, if the selective content presentation engine 134 determines that the content portion is to be modified ("yes" at decision block 1012), the process 1000 may proceed to block 1014. For example, the user preferences may indicate that the user wishes to replace the face of a particular person shown in a visual image of the media object, as recognized by the image recognition algorithm, with the face of another person.

At block 1014, the selective content presentation engine 134 may modified the content portion by replacing or suppressing at least a part of the content portion. For example, the selective content presentation engine 134 may replace a part of the content portion that is a visual image (e.g., a face of a person) with a different graphic (e.g., face of another person).

At block 1016, the modified content portion may be presented by a presentation application of the electronic device 102. Subsequently, the process 1000 may loop back to block 1004 so that a subsequent content portion may be received and analyzed by the selective content presentation engine 134.

However, if at decision block 1012 the selective content presentation engine 134 determines that the content portion does not need to be modified ("no" at decision block 1012), the process 1000 may proceed to block 1016, at which point the content portion may be presented by the presentation application of the electronic device 102. Following the presentation, the process 1000 may loop back to block 1004 so that a subsequent content portion may be received and analyzed by the selective content presentation engine 134.

Figure 11:
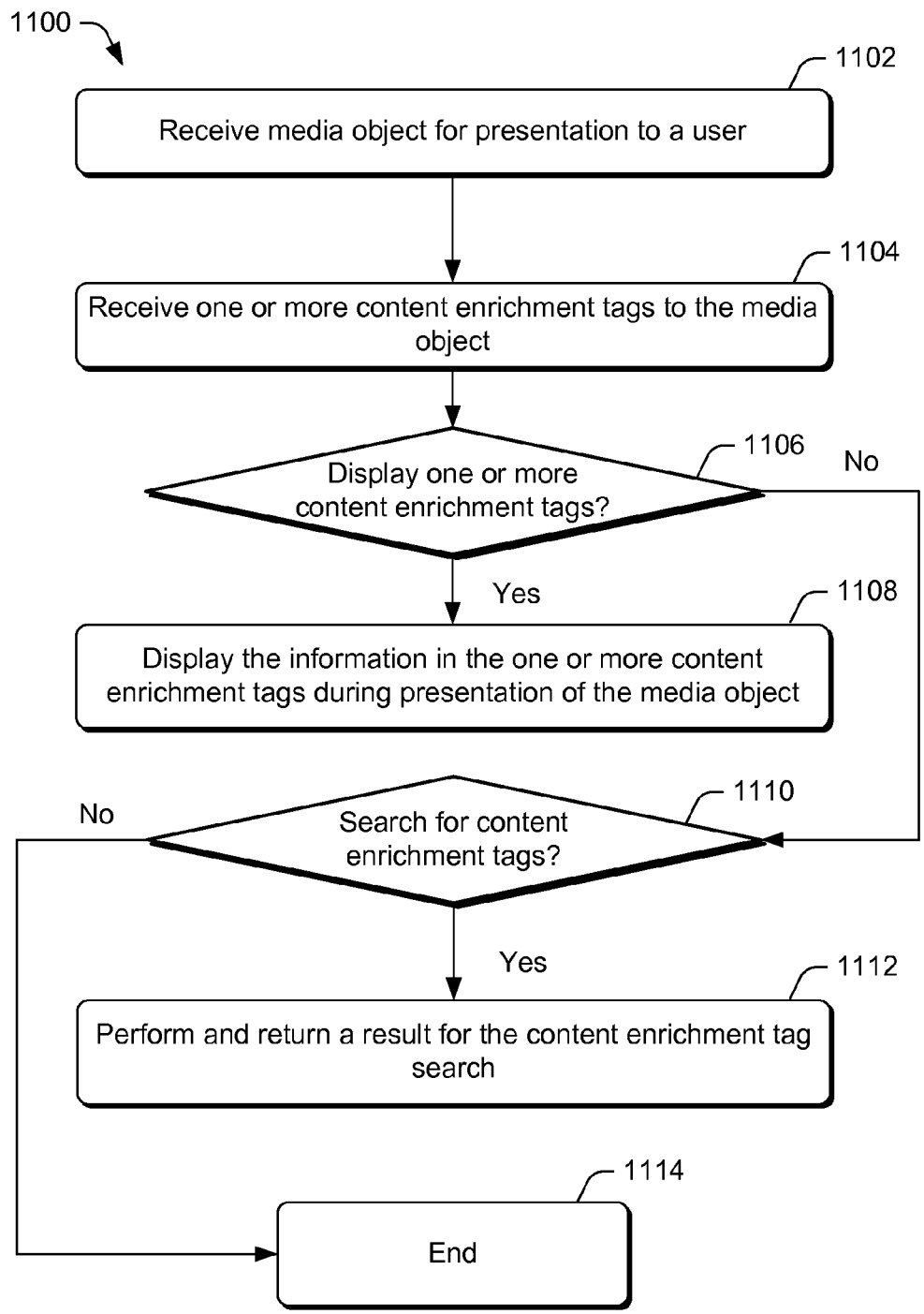
FIG. 11 is a flow diagram of an illustrative process for supplementing content presentation via content enrichment tags.

FIG. 11 is a flow diagram of an illustrative process 1100 for supplementing content presentation via content enrichment tags. At block 1102, the electronic device 102 may receive a media object for presentation to a user. In some embodiments, the media object may be distributed to the electronic device 102 by the content distributor 104 as part of a broadcast for presentation on the electronic device 102. In other embodiments, the media object may be previously received and downloaded into the data storage 154 of the electronic device 102.

At block 1104, the selective content presentation engine 134 of the electronic device 102 may receive one or more content enrichment tags to the media object. The media object may be an audiovisual work, and each of the content enrichment tags may correspond to a particular temporal position in audiovisual work. In some embodiments, the engine 134 may receive the content enrichment tags for the media object from the content tag provider 106 and/or the community tag provider 108 prior to or during the presentation of the media object. In other embodiments, the user may use the selective content presentation engine 134 to place content enrichment tags into the media object during the presentation of the media object on the electronic device 102.

At decision block 1106, the selective content presentation engine 134 may determine whether the one or more content enrichment tags are to be displayed based on content supplementation preferences from the user. For example, the user may use a category selection menu 502 (FIG. 5) to select at least one category of content enrichment tags to be displayed for the media object. Accordingly, the selective content presentation engine 134 may cause a media presentation application of the electronic device 102 to display the received content enrichment tags that belong to the at least one category during the presentation of the media object. Thus, if the selective content presentation engine 134 determines that the one or more content enrichment tags are to be displayed ("yes" at decision block 1106), the process 1100 may proceed to block 1108.

At block 1108, the selective content presentation engine 134 may display the information in the one or more content enrichment tags during the presentation of the media object. In various embodiments, the information in the one or more content enrichment tags may be displayed sequentially in temporal order as the media object is presented. However, if the selective content presentation engine 134 determines that no content enrichment tags are to be displayed ("no" at decision block 1106), the process 1000 may proceed to decision block 1110.

At decision block 1110, the selective content presentation engine 134 may determine whether the user has requested to search for content enrichment tags. In various embodiments, the selective content presentation engine 134 may present the user interface 700 (FIG. 7) that enables a user to select one or more categories of content enrichment tags, the user interface 700 may also enable the user to enter a search string. Accordingly, if the user has requested a search for one or more specific content enrichment tags ("yes" at decision block 1110), the process 1100 may proceed to block 1112.

At block 1112, the selective content presentation engine 134 may perform and return a result for the content enrichment tag search. As such, if the selective content presentation engine 134 is able to match the search string to information in a content enrichment tag of the media object, the engine 134 may indicate that a match is found, as well as provide time location information that shows the portion of the media object at which the matching content enrichment tag resides. However, if the selective content presentation engine 134 is not able to match the search string to information in any of the content enrichment tags of the media object, the engine 134 may indicate to the user that the media object does not contain any matching content enrichment tags.

Returning to block 1110, if selective content presentation engine 134 determines that the user is not requesting a search for content enrichment tags ("no" at decision block 1110), the process 1100 may terminate at block 1114.

In summary, the techniques and devices for selective content presentation in accordance with the various embodiment described above may enable a user to self-impose censoring on the content that the user consumes, and/or enrich the content consumption experience. In this way, the user may avoid inadvertent exposure to content that the user does not wish to consume, as well as control the time and place to consume selective or supplemental content. Accordingly, the user's content consumption experience may be enriched or enhanced.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method, comprising:
    under control of one or more computing systems configured with executable instructions,
    acquiring a content suppression preference that designates an image content that is positioned at a particular position within a visual image for suppression and an additional content suppression preference that designates a particular content for suppression at an electronic device;
    receiving a content portion and a content selection tag for the content portion at the electronic device, the content selection tag indicating that the content portion includes the visual image having the image content positioned at the particular position;
    suppressing a first part of the content portion of the visual image in response to the electronic device determining that the first part of the content portion includes the visual image having the image content positioned at the particular position, and suppressing a second part of the content portion in response to determining via an image recognition algorithm or an audio recognition algorithm of the electronic device that the second part of the content portion matches the particular content that is designated for suppression by the content suppression preference, the suppressing of the image content and the second part producing a modified content portion; and
    causing the modified content portion to be presented via the electronic device.

2. The computer-implemented method of claim 1, wherein the acquiring includes acquiring the content suppression preference for a user from a server in response to the user authenticates at the electronic device.

3. The computer-implemented method of claim 1, wherein at least one of the first part and the second part of the content portion comprises a visual image, and the suppressing includes at least one of preventing presentation of the visual image, blurring the visual image, and replacing the visual image with a different visual image.

4. The computer-implemented method of claim 1, wherein at least one of the first part and the second part of the content portion comprises an audio portion, and the suppressing includes at least one of muting the audio portion and replacing the audio portion with a different audio portion.

5. The computer-implemented method of claim 1, wherein at least one of the first part or the second part of the content portion comprises text, and the suppressing includes at least one of blanking out the text and replacing the text with a different text.

6. The computer-implemented method of claim 1, wherein the acquiring includes acquiring the content suppression preference via a user interface provided by the electronic device.

7. The computer-implemented method of claim 1, further comprising presenting a reason for suppressing at least one of the first part or the second part of the content portion.

8. The computer-implemented method of claim 1, further comprising presenting a user interface for un-suppressing at least one of the first part or the second part of the content portion.

9. The computer-implemented method of claim 1, wherein the suppressing the first part includes at least one of preventing the image content from being presented, blurring visual content, and replacing the image content with different visual content.

10. The computer-implemented method of claim 1, wherein the second part of the content portion is an audio portion of a media object, and wherein the suppressing includes at least one of muting at least one part of the audio portion and replacing the audio portion with a different audio portion.

11. The computer-implemented method of claim 1, wherein the second part of the content portion is a visual image of a media object, and wherein the suppressing includes at least one of preventing at least one part of the visual image from being presented, blurring the at least one part of the visual image, and replacing the at least one part of the visual image with a different visual image.

12. An electronic device, comprising:
    a processor; and
    memory storing components executable by the processor, the components comprising:
    a preference component configured to receive a content suppression preference that describes one or more content portions to be blocked from being presented and a content supplementation preference;
    a data share component configured to receive a content selection tag for a content portion inputted by a user of the electronic device, the user being distinct from a community tag provider or a provider of the content portion, the content selection tag being descriptive of the content portion;
    a content suppression component configured to receive the content portion and an additional content portion, wherein the content suppression component suppresses the content portion in response to determining from the content selection tag that the content portion is designated for suppression by the content suppression preference, and wherein the content suppression component suppresses at least one part of the additional content portion to form a modified content portion in response to determining via an image recognition algorithm or an audio recognition algorithm that the at least one part of the additional content portion matches the one or more content portions designated to be blocked by the content suppression preference; and a presentation application component configured to cause the modified content portion to be presented.

13. The electronic device of claim 12, further comprising a content supplementation component configured to determine, based on the content supplementation preference, whether to present information regarding the content portion that is included in a content enrichment tag for the content portion, wherein the presentation application component further causes the information included in the content enrichment tag to be presented.

14. The electronic device of claim 12, further comprising an authentication component configured to authenticate a user at the electronic device, wherein the preference component is configured to receive the content suppression preference for the user following user authentication at the electronic device.

15. The electronic device of claim 12, wherein the data share component further receives or transmits at least one of the content suppression preference and a content enrichment tag from another electronic device or a server.

16. The electronic device of claim 12, wherein the content portion is a visual image of a media object, and wherein the content suppression component suppresses the at least one part of the content portion by at least one of preventing the at least one part of the visual image from being presented, blurring the at least one part of the visual image, or replacing the at least one part of the visual image with a different visual image.

17. The electronic device of claim 12, wherein the content portion is an audio portion of a media object, and wherein the content suppression component suppresses the at least one part by at least one of muting the at least one part of the audio portion or replacing the audio portion with a different audio portion.

18. The electronic device of claim 12, wherein the content portion is text in a text object, and wherein the content suppression component suppresses the at least one part by at least one of blanking out the text or replacing the text with a different text.

19. The electronic device of claim 12, wherein the content portion is a part of a multi-layer content stream that includes a plurality of sub streams, and wherein the content suppression component suppresses at least one sub stream of the plurality of sub streams.

20. One or more non-transitory computer readable media storing computer-executable instructions that, when executed, cause one or more processors to perform acts comprising:

accessing a content suppression preference that designates an image content that is positioned at a particular position within a visual image for suppression and an additional content suppression preference that designates a particular content for suppression at an electronic device;

accessing a content portion and a content selection tag for the content portion at the electronic device, the content selection tag indicating that the content portion includes the visual image having the image content positioned at the particular position;

suppressing a first part of the content portion of the visual image in response to the electronic device determining that the first part of the content portion includes the visual image having the image content positioned at the particular position, and suppressing a second part of the content portion in response to determining via an image recognition algorithm or an audio recognition algorithm of the electronic device that the second part of the content portion matches the particular content that is designated for suppression by the content suppression preference, the suppressing of the image content and the second part producing a modified content portion; and causing the modified content portion to be presented via the electronic device.

21. The one or more non-transitory computer readable media of claim 20, wherein the accessing the content suppression preference includes acquiring the content suppression preference for a user from a server in response to the user authenticates at the electronic device.

22. The one or more non-transitory computer readable media of claim 20, wherein at least one of the first part and the second part of the content portion comprises a visual image, and the suppressing includes at least one of preventing presentation of the visual image, blurring the visual image, and replacing the visual image with a different visual image.

23. The one or more non-transitory computer readable media of claim 20, wherein at least one of the first part and the second part of the content portion comprises an audio portion, and the suppressing includes at least one of muting the audio portion and replacing the audio portion with a different audio portion.

24. The one or more non-transitory computer readable media of claim 20, wherein at least one of the first part or the second part of the content portion comprises text, and the suppressing includes at least one of blanking out the text and replacing the text with a different text.

25. The one or more non-transitory computer readable media of claim 20, wherein the accessing the content suppression preference includes acquiring the content suppression preference via a user interface provided by the electronic device.

26. The one or more non-transitory computer readable media of claim 20, further comprising instructions that when executed, cause one or more processors to perform an act of presenting a reason for suppressing at least one of the first part or the second part of the content portion.

27. The one or more non-transitory computer readable media of claim 20, further comprising instructions that when executed, cause one or more processors to perform an act of presenting a user interface for un-suppressing at least one of the first part or the second part of the content portion.

28. The one or more non-transitory computer readable media of claim 20, wherein the suppressing the first part includes at least one of preventing the image content from being presented, blurring visual content, and replacing the image content with different visual content.

29. The one or more non-transitory computer readable media of claim 20, wherein the second part of the content portion is an audio portion of a media object, and wherein the suppressing includes at least one of muting at least one part of the audio portion and replacing the audio portion with a different audio portion.

30. The one or more non-transitory computer readable media of claim 20, wherein the second part of the content portion is a visual image of a media object, and wherein the suppressing includes at least one of preventing at least one part of the visual image from being presented, blurring the at least one part of the visual image, and replacing the at least one part of the visual image with a different visual image.

* * * * *